US012528119B2

(12) United States Patent
Rau

(10) Patent No.: US 12,528,119 B2
(45) Date of Patent: Jan. 20, 2026

(54) PRESSING DEVICE

(71) Applicant: DORST Technologies Gmbh & Co. KG, Kochel am See (DE)

(72) Inventor: Walter Rau, Großweil (DE)

(73) Assignee: DORST Technologies Gmbh & Co. KG, Kochel am See (DE)

( * ) Notice: Subject to any disclaimer, the term of this patent is extended or adjusted under 35 U.S.C. 154(b) by 0 days.

(21) Appl. No.: 17/654,162

(22) Filed: Mar. 9, 2022

(65) Prior Publication Data

US 2022/0288682 A1 Sep. 15, 2022

(30) Foreign Application Priority Data

Mar. 9, 2021 (DE) ........................ 102021105649.7

(51) Int. Cl.
*B22F 3/03* (2006.01)
*B28B 3/04* (2006.01)
*B30B 11/02* (2006.01)

(52) U.S. Cl.
CPC .................. *B22F 3/03* (2013.01); *B28B 3/04* (2013.01); *B30B 11/027* (2013.01)

(58) Field of Classification Search
CPC ........................................................ B22F 3/03
See application file for complete search history.

(56) References Cited

U.S. PATENT DOCUMENTS 2,598,016 A 5/1952 Richardson
4,544,517 A 10/1985 Ohno
6,241,935 B1 * 6/2001 Beane ....................... B28B 7/44 425/258
2010/0252957 A1 10/2010 Andrews et al.
2016/0121516 A1 * 5/2016 Bolander .................. B22F 3/02 264/109

FOREIGN PATENT DOCUMENTS

| | | | |
|---|---|---|---|
| DE | 18916 | A1 * | 5/1960 |
| DE | 10 2006 0051666 | A1 | 5/2008 |
| EP | 0 488 334 | A2 | 6/1992 |
| EP | 2052848 | A1 | 4/2009 |
| JP | 2008-56976 | A | 3/2008 |
| JP | 2010-007132 | A | 1/2010 |
| WO | 98/35806 | A1 | 8/1998 |

OTHER PUBLICATIONS

European Search Report issue for European Patent Application No. 22160958.9, dated Jul. 26, 2022 in 33 pages.
Search Report issued in the corresponding German Priority Application No. DE 10 2021 105 649.7 in 124 pages.

* cited by examiner

*Primary Examiner* — Jophy S. Koshy
*Assistant Examiner* — Joshua S Carpenter
(74) *Attorney, Agent, or Firm* — Knobbe, Martens, Olson & Bear, LLP

(57) ABSTRACT

A powder pressing device, such as a metal powder or ceramic powder pressing device includes at least one die and at least one punch. In a pressing position, the punch is arranged to be immersible from a first side of the die into a cavity filled with powder. The powder pressing device further includes at least one powder sealing device, which can have at least two parts. The powder sealing device can be arranged in sections, which can be arranged completely around the cavity.

19 Claims, 4 Drawing Sheets

PRESSING DEVICE

CROSS-REFERENCE TO RELATED APPLICATIONS

This application claims priority to German Patent Application No. 102021105649.7 filed on Mar. 9, 2021, the disclosure of which including the specification, the drawings, and the claims is hereby incorporated by reference in its entirety.

FIELD OF THE INVENTION

The invention relates to a pressing device, in particular a metal powder and/or ceramic powder pressing device, as well as a method for powder pressing a powder pressing part, in particular a ceramic powder pressing part and/or metal powder pressing part.

BACKGROUND OF THE INVENTION

Such powder pressing devices (powder presses) are basically known from the prior art. In the prior art, a cavity (filling space) is filled in a die of the press equipment. A punch (upper punch) then dips into the filling space (cavity) filled in this way, in order to press the pressed part.

Basically, different possibilities for filling the filling space are known. According to a standard procedure, a filling shoe (filling slide) moves over an open cavity, wherein the powder can then trickle in. A corresponding filling is often comparatively irregular.

During suction filling, the filling shoe (filling slide or filler) can be moved over a cavity that is still closed. The die can then be lifted. A filling space is then filled more uniformly (than in the standard process described above).

During overfilling, the die can move (at least slightly) higher, resulting in a larger filling quantity. Before moving back the filler (filling shoe or filling slide), an actually required die height or filling height can be set. Excess powder can optionally be scraped off the filling shoe.

When underfilling, the die can be lifted after a successful filling, so that existing powder sinks deeper into the die. Here, the die can be closed before the punch touches the powder. The powder is then optionally unable to escape.

Overall, powder filling in the prior art is still considered to be in need of improvement, especially with regard to the most accurate possible setting of the powder quantity which is then ultimately also pressed.

SUMMARY OF THE INVENTION

It is the object of the invention to propose a powder pressing device, in particular a metal powder and/or ceramic powder pressing device, wherein the filling with powder, in particular also with tapering and/or stepped punch geometries (upper punch geometries), is proposed comparatively precisely, in particular at least substantially without loss of powder or at least with only comparatively small loss of powder. Furthermore, it is the object of the invention to propose a corresponding method.

This object is solved in particular by the features described herein.

In particular, the object is solved by a powder pressing device (powder press), in particular a metal powder and/or ceramic powder pressing device (metal powder and/or ceramic powder press), comprising at least one die, at least one (first) punch (upper punch), which (in a pressing position) is arranged to be immersible from a first (upper) side into a cavity (die opening or cavity or filling space) of the die filled with powder (ceramic and/or metal powder), and at least one powder sealing device which can be arranged at least in sections (preferably completely) around the cavity (or an upper edge thereof) and in particular has at least two parts.

One idea of the invention is to provide a powder sealing device which can be arranged around the cavity (or an upper edge thereof) in such a way that, when the punch (upper punch) is plunged into the cavity, powder is at least substantially prevented (or at least reduced) from being conveyed out of the cavity (for example, splashed out and/or pressed out). In this way, a more precise setting of the powder volume can be achieved, which is ultimately also pressed into the pressed part. Furthermore, powder losses can be reduced.

An arrangement around the cavity (or an upper edge thereof) is to be understood in particular as an arrangement in which the powder sealing device extends along the (upper) edge of the cavity. At least in one position (for example, an initial position when a tapered end section of the punch or an end section of comparatively small diameter enters the cavity), the powder sealing device may also overlap (at the level of an upper punch surface) a cross-sectional area of the cavity (in a projection of the sealing device onto said level). In specific embodiments, the sealing device is arranged to lie (at least in any sealing position) outside this cross-sectional area of the cavity (but preferably immediately adjoining it, optionally apart from a smaller clearance to form a gap with respect to the punch). In further embodiments, this is the case at least in a (sealing) position of the sealing device, in particular in an end position (in which the punch has performed its maximum travel into the cavity).

An at least sectional (partial) arrangement around the cavity means in particular an arrangement in which the sealing device surrounds (or is arranged along) the edge of the cavity over an angular range of at least 180°, preferably at least 270°, still further preferably at least 350°, optionally at least 359° or 360°.

The powder sealing device is preferably adjustable. If the powder sealing device is designed in two or more parts, these two or more parts of the powder sealing device can preferably move relative to each other (in particular in the direction of an upper die surface). The two or more parts can preferably separate completely from each other (so that they are no longer connected). Optionally, it would also be conceivable that the two or more parts are connected to each other (at least over a certain range of relative movement) by a connecting and/or coupling device (allowing a change in distance for relative movement).

Preferably, the sealing device (at least partially, in the case of two or more parts this preferably applies to several or all of these several parts) is movable transversely to a direction of movement of the punch (in the case of several parts this also applies in particular to a movement of the individual parts relative to one another), preferably along a surface adjacent to the cavity of the die. Particularly preferably, the sealing device (or its parts) is displaceable, in particular in such a way that it is moved (slides) along a surface of the die adjacent to the cavity during the movement or adjustment. In this way, it is particularly easy to precisely position the sealing device so that it can realize its sealing function.

The sealing device may remain in place during movement of the upper punch (or distal end thereof) within the cavity (or, in conceivable alternative embodiments, may be moved during this time).

A movement transversely to a direction of movement of the punch is to be understood in particular in such a way that the sealing device is movable at an angle of 90° (optionally exclusively at such an angle) relative to the direction of movement of the punch (from top to bottom). However, it would also be conceivable that the movement takes place at an angle which is at least 10° or at least 30° or at least 60° or at most 90° or at most 80° with respect to the direction of movement of the punch. It is also conceivable that the movability of the sealing device or its concrete movement changes during the bringing into a sealing position.

In general, the sealing device may also be moved by pivoting the same or parts thereof (optionally relative to each other). Even more generally, the sealing device can be moved purely translationally or purely rotationally or both translationally and rotationally to bring it into a sealing position (this can also apply to several or all of possibly several parts of the sealing device that are movable relative to each other).

In one specific embodiment, at least one part of the sealing device is arranged or arrangeable on a filling shoe (filler), for example formed as an integral part thereof or attached or attachable thereto. Preferably, a first part of the sealing device is arranged or arrangeable on a first filling shoe (filler), for example formed as an integral part thereof or attached or attachable thereto, and a second part of the sealing device is arranged or arrangeable on a second filling shoe (filler), for example formed as an integral part thereof or attached or attachable thereto.

Specifically, the sealing device or the (respective) first or second part can be screwed and/or welded to the (respective) filling shoe and/or attached by clamping and/or tensioning means and/or in still other ways. With such an integration into a filling shoe structure, the corresponding filling shoe (or the overall structure, comprising the sealing device or its first/second/further part) can easily fulfill a double function, namely, on the one hand, to convey the powder towards the hollow space (cavity) at all, in order to bring the powder into the cavity, on the one hand, and, on the other hand, to realize a sealing. Particularly preferably, the same drive device can be used to realize both the movement of the filling shoe for filling the cavity, and the movement of the filling shoe (or the structure with the sealing device, or the part of it) for sealing.

A distal end of the punch (upper punch) is preferably formed such that a projection of a cross-section of this distal end onto a plane of the (upper) surface of the die or an upper cross-section of the cavity is at least partially spaced from an edge of the cavity. The spacing from the edge of the cavity may be, for example, at least 0.1 mm or at least 0.5 mm or at least 1.0 mm and/or at most 1.0 cm (over at least an angular range of 180° of the edge, optionally the entire edge). In such an embodiment, insertion of the (upper) punch into the powder-filled cavity—without the sealing device according to the invention—would lead to powder being pressed out of the cavity (or splashing out) to a particularly pronounced degree. This is prevented or at least reduced in an advantageous way by the sealing device.

In one specific embodiment, the (upper) punch tapers at least in sections in the direction of its distal end. The punch can be beveled and/or have a step and/or have at least in sections (in at least one longitudinal section; for example, in a transition between two upper punch sections) at least one rounding and/or arcuate shape, e.g., rounded off and/or rounded out. A bevel is preferably understood to mean a bevel that is at least sectionally planar and/or frustoconical. In embodiments, a distal end section of the punch may be formed by a cone or frustoconical section. It is conceivable that a distal end section of the punch is formed by a (for example straight), in particular circular, cylinder, which is adjoined by a further section of the punch (for example a further cylinder, in particular circular cylinder) having a larger diameter (wherein a transition between the sections may be rounded out).

The sealing device can be arranged around the punch in such a way that between the sealing device and the punch, at least in sections (e.g. over an angular range of at least 180° or at least 270° or at least 350° or 360°), a clearance is formed, in particular in the form of a gap, optionally circumferential, such that air can escape from the cavity. The clearance is preferably at least 10 micrometers and/or at most 500 micrometers or at most 300 micrometers or at most 100 micrometers. Air can escape from the cavity through such a distance (gap) despite the sealing device, so that (undesired) air compression does not occur here.

Preferably, the sealing device (in the sealing state) lies tightly against a surface (upper surface of the die) surrounding the cavity. In particular, the sealing device is flat on its underside, wherein this flat underside lies or can lie (tightly) against the (upper) surface of the die.

The sealing device can have at least two segments (parts) which are adjustable relative to one another (in particular, optionally butt-contacting) and which are preferably in engagement with one another in the sealing state of the sealing device, in particular via at least one projection which is in engagement with at least one recess. Engagement can preferably occur via a zig-zag structure or sawtooth structure and/or via a tongue-and-groove connection. The engagement preferably takes place in such a way that the two segments are connected to each other in such a way that the engagement counteracts a force (facing in the direction of a connecting plane), in particular from the inside to the outside.

In various embodiments, the sealing device may have at least or exactly two or at least or exactly three or at least or exactly four segments (parts) that are adjustable relative to one another. If the sealing device has several segments (parts), these can preferably be adjusted independently of the respective other segments (parts). Alternatively, it is also possible that only one common (optionally synchronized) adjustment is possible or at least adjustable.

The above-mentioned object is further solved in particular by a method for powder pressing of a powder pressing part, in particular ceramic powder pressing part and/or metal powder pressing part, using the above pressing device. In the method, powder is preferably filled into a cavity of the die, the sealing device is arranged around a die opening and (thereupon) the punch (upper punch) is immersed into the cavity (hollow) for pressing. Further method features result from the above and/or following description of the pressing device. Functional features of the pressing device (or corresponding configurations thereof) can be carried out as specific method steps. If, for example, it is disclosed above and/or below that a part of the pressing device can be arranged or adjusted, this is intended to mean for the method in particular that a corresponding arrangement (as a step, in particular comprising a change in position) can be carried out or a corresponding step for adjustment is carried out.

The above-mentioned object is further solved in particular by the use of a pressing device of the above type for powder pressing a powder pressing part, in particular for pressing a ceramic powder pressing part and/or metal powder pressing part.

In embodiments, the pressing device may generate a press force of at least 1.0 metric ton or at least 10 metric tons or at least 100 metric tons and/or at most 1000 metric tons.

Further embodiments are apparent from the subclaims.

BRIEF DESCRIPTION OF THE DRAWINGS

The invention is described below with reference to exemplary embodiments, which are explained in more detail with reference to the figures, wherein.

DETAILED DESCRIPTION OF EMBODIMENTS

In the following description, the same reference numbers are used for identical parts and parts with the same effect.

Figure 1:
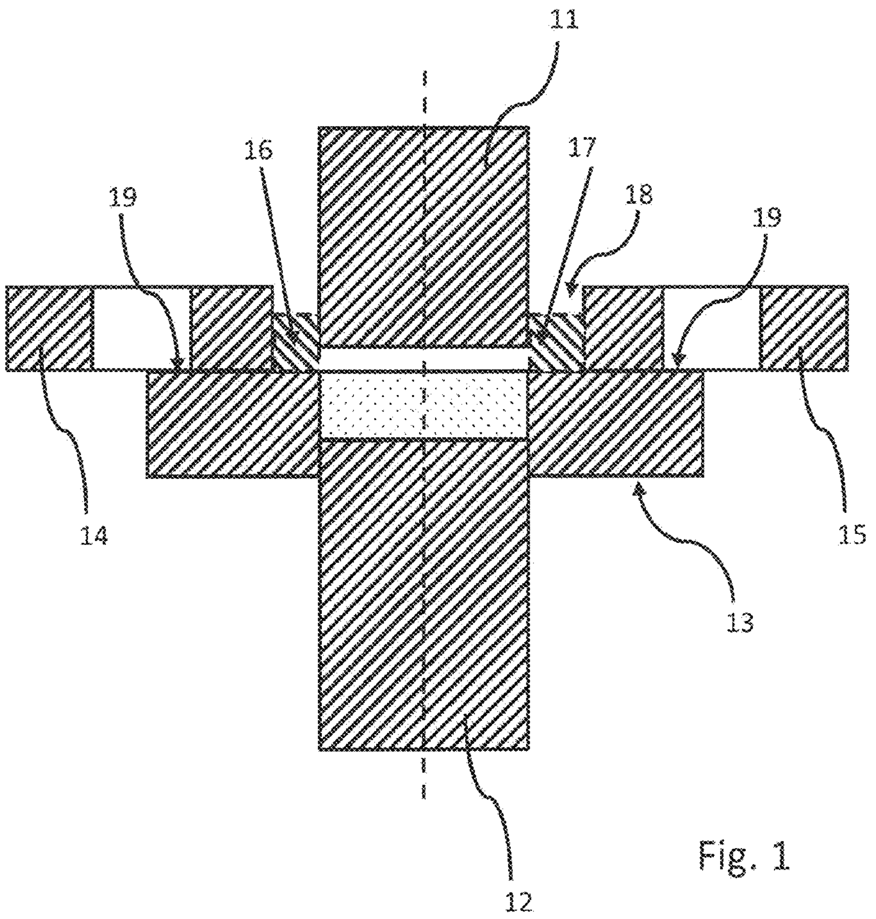
FIG. 1 shows a schematic section (cross-section or vertical section) of a pressing device according to the invention.

FIG. 1 shows (in a schematic horizontal section) a pressing device comprising an upper punch 11, an (optional) lower punch 12, a die 13, a first filler 14 (filling shoe) and a second filler 15 (filling shoe). Attached to the first filler 14 is a first part 16 of a sealing device 18. A second part 17 of the sealing device 18 is attached to the second filler 15. In the present example, the sealing device is formed in two parts (but may have more than two parts in alternative embodiments). In particular, the first part 16 is movable together with the first filler 14 (along a die surface 19, to the left in FIG. 1). The second part 17 of the sealing device 18 can also be moved (together with the second filler 15) (along the die surface 19, to the right in FIG. 1). FIG. 1 shows a condition of the pressing device before the upper punch enters a cavity 20 within the die 13. As soon as the upper punch 11 dips into the cavity 20 and contacts the powder in this cavity 20, this leads to a possible displacement and a possible conveying of the powder out of the cavity (if the sealing device 18 would not be provided). However, the sealing device 18 prevents such conveying out.

Figure 2:
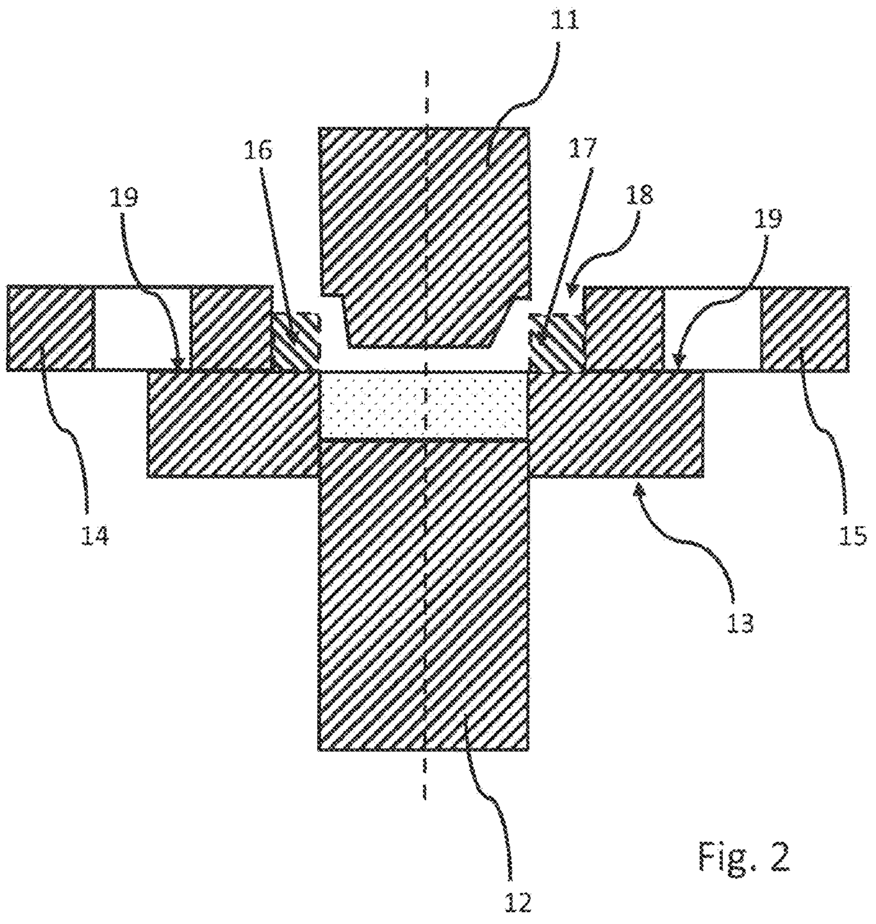
FIG. 2 shows an alternative embodiment in a section analogous to FIG. 1.

This is particularly pronounced in the case of a stepped and/or beveled punch. For example, an upper punch with a beveled (frustoconical) end section as well as a step is shown in FIG. 2 (in alternative embodiments, only one bevel or only one step and/or several steps and/or several bevels with different pitches can also be formed).

Figure 3:
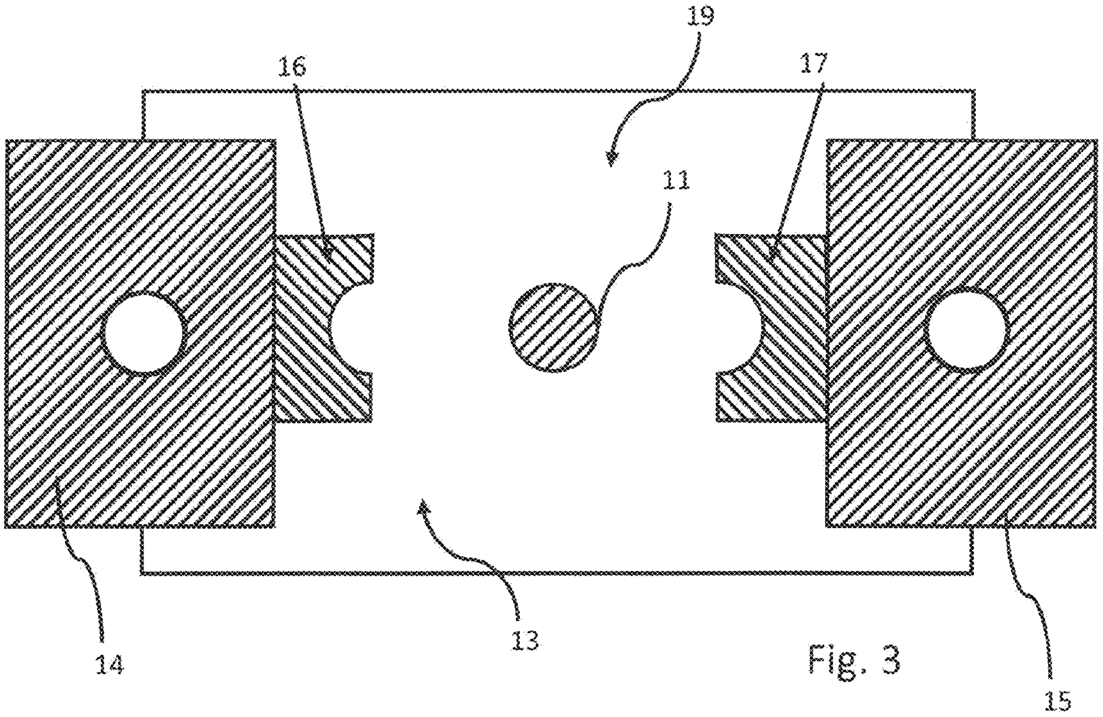
FIG. 3 shows the pressing device according to FIG. 1 in a schematic horizontal section in a first position.
Figure 4:
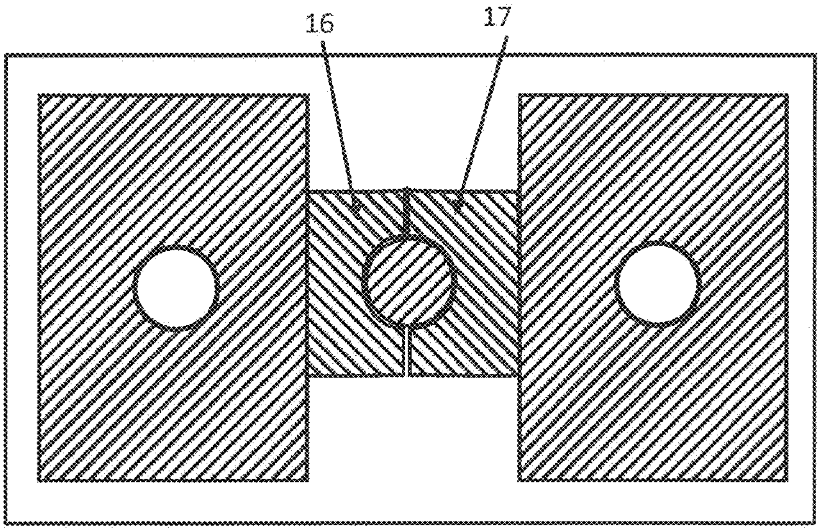
FIG. 4 shows the pressing device according to FIG. 1 in a schematic horizontal section in a second position.

A horizontal section of the pressing device according to FIG. 1 (or also FIG. 2) is shown in FIGS. 3 and 4. In FIG. 3, the parts 16, 17 of the sealing device 18 are removed from the cavity below the punch 11 (and not in sealing position). In particular, it can be seen that the parts 16, 17 of the sealing device 18 are attached to the respective fillers (filler shoes) 14, 15 (or are integrated into a corresponding filler structure) so that they are movable together with the respective filler and can thus be brought into a sealing position (according to FIG. 4).

It is also conceivable to have a filling space seal which is separate from a (regular) filling shoe. This can, for example, be retracted by an electric, hydraulic and/or pneumatic drive parallel to the original filling shoe and/or rotated in the plane as required.

Alternatively or additionally, it is also conceivable to swivel in the device, e.g. with a corresponding rotary drive.

Figure 5:
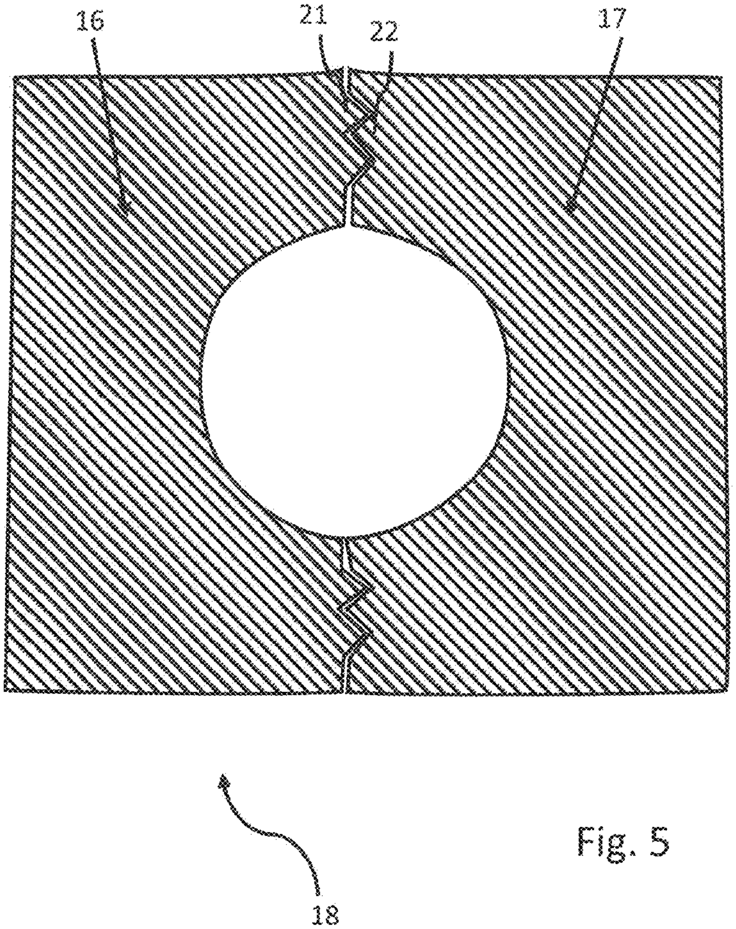
FIG. 5 shows an alternative embodiment in a horizontal section.

FIG. 5 shows a cross-section of an alternative embodiment of the sealing device 18 (in a schematic horizontal section). In particular, engagement structures 21, 22 (shown here by way of example in the form of, in particular, sawtooth-like intermeshing projections) can be seen here, which bring the individual parts 16, 17 of the sealing device 18 into engagement with one another.

It should be noted at this point that all the parts described above, taken individually and in any combination, in particular the details shown in the drawings, are claimed to be essential to the invention. Modifications hereof are familiar to the person skilled in the art.

LIST OF REFERENCE SIGNS

11 Upper punch
12 Lower punch
13 Die
14 Filler (filling shoe)
15 Filler (filling shoe)
16 First part
17 Second part
18 Sealing device
19 Surface
20 Cavity
21 Engagement structure
22 Engagement structure

What is claimed is:

1. A powder pressing device, comprising:

at least one die;

at least one first punch, which in a pressing position is arranged to be dippable from a first side into a cavity of the die filled with a powder; and at least one powder sealing device which is arranged at least in sections around the cavity and has at least a first part and a second part that are moveable relative to each other, wherein the first part and the second part are configured to be movable transversely to a direction of movement of the first punch such that the first part and the second part slide over the die and move towards the first punch in a sealing position, and move away from the first punch in a non-sealing position, wherein the first and second parts of the sealing device are displaceable, in such a way that they are slid along a surface of the die adjacent to the cavity during the movement of the first punch.

2. The pressing device according to claim 1, wherein at least one part of the sealing device is arranged or is configured to be arranged on a filling shoe.

3. The pressing device according to claim 1, wherein a projection of a cross-section of a distal end of the punch onto a plane of the upper surface of the die is at least partially spaced from an edge of a hollow chamber.

4. The pressing device according to claim 1, wherein the punch tapers at least in sections in the direction of its distal end.

5. The pressing device according to claim 1, wherein the sealing device can be arranged around the punch in such a way that between the sealing device and the punch, at least in sections, a clearance is formed in the form of an optionally circumferential gap, in such a way that air can escape from the cavity.

6. The pressing device according to claim 1, wherein a flat underside of the sealing device in the sealing state lies against a surface of the die surrounding the cavity.

7. The pressing device according to claim 1, wherein the sealing device has at least two segments which are adjustable relative to one another.

8. A method for pressing a powder, comprising;

providing the pressing device according to claim 1; and operating the pressing device on the powder.

9. The pressing device according to claim 1, wherein the sealing device is movable along a surface adjacent to the cavity of the die.

10. The pressing device according to claim 1, wherein the powder is a metal powder or a ceramic powder.

11. The pressing device according to claim 1, wherein the powder sealing device is arranged completely around the cavity.

12. The pressing device according to claim 2, wherein the first part of the sealing device is formed as an integral part of the filling shoe or is attached or configured to be attached thereto, and the second part of the sealing device is formed as an integral part of the filling shoe or is attached or configured to be attached thereto.

13. The pressing device according to claim 4, wherein the punch is beveled and/or has a step.

14. The pressing device according to claim 5, wherein the clearance is at least 10 micrometers and at most 100 micrometers.

15. The pressing device according to claim 7, wherein the at least two segments are in engagement with one another in the sealing state of the sealing device, via at least one projection which is in engagement with at least one recess and/or at least one corresponding projection.

16. The pressing device according to claim 7, wherein the sealing device has exactly two, three or four segments which are adjustable relative to one another.

17. The pressing device according to claim 7, wherein the sealing device has three or more segments which are adjustable relative to one another.

18. The pressing device according to claim 7, wherein the sealing device has four or more segments which are adjustable relative to one another.

19. The method according to claim 8, wherein the operating comprises:

filling powder into the cavity of the die;

arranging the sealing device around a die opening, and plunging the punch into the cavity for pressing.

* * * * *